United States Patent
Francis

(10) Patent No.: US 10,807,406 B2
(45) Date of Patent: Oct. 20, 2020

(54) OLD WORK BOX DEVICE

(71) Applicant: Walter Francis, Stafford, VA (US)

(72) Inventor: Walter Francis, Stafford, VA (US)

( * ) Notice: Subject to any disclaimer, the term of this patent is extended or adjusted under 35 U.S.C. 154(b) by 249 days.

(21) Appl. No.: 16/111,780

(22) Filed: Aug. 24, 2018

(65) Prior Publication Data

US 2020/0062024 A1 Feb. 27, 2020

(51) Int. Cl.
| | | |
|---|---|---|
| *B43L 13/20* | (2006.01) | |
| *G01C 9/00* | (2006.01) | |
| *G01B 3/1071* | (2020.01) | |
| *G01V 3/08* | (2006.01) | |
| *G01B 3/1084* | (2020.01) | |

(52) U.S. Cl.
CPC ............ *B43L 13/20* (2013.01); *G01B 3/1071* (2013.01); *G01B 3/1084* (2013.01); *G01C 9/00* (2013.01); *G01V 3/08* (2013.01)

(58) Field of Classification Search
CPC ........................................................ B43L 13/20
USPC ............................................. 33/528, DIG. 10
See application file for complete search history.

(56) References Cited

U.S. PATENT DOCUMENTS

| | | | | |
|---|---|---|---|---|
| 4,791,731 A | * | 12/1988 | Dickinson | ................ B25H 7/00 33/384 |
| 4,793,069 A | | 12/1988 | McDowell | |
| 5,222,303 A | * | 6/1993 | Jardine | .................... G01B 3/02 33/528 |
| 5,813,130 A | * | 9/1998 | MacDowell | ............. G01C 9/28 33/528 |
| 6,223,445 B1 | * | 5/2001 | Schuette, Jr. | ............ B25H 7/04 33/528 |
| 6,226,882 B1 | * | 5/2001 | Barr | ......................... B25H 7/02 101/327 |
| 6,434,848 B1 | | 8/2002 | Gordon et al. | |
| 6,810,598 B2 | | 11/2004 | Boys | |
| 6,944,964 B1 | * | 9/2005 | Easter | ...................... G01B 3/14 33/528 |
| 7,134,217 B2 | | 11/2006 | Melittas | |
| 7,210,241 B1 | * | 5/2007 | Bree | ........................ B25H 7/04 33/528 |
| 8,250,773 B1 | * | 8/2012 | Shotey | ..................... H02G 3/00 33/528 |
| 8,281,496 B1 | | 10/2012 | Mies | |
| 9,228,832 B2 | | 1/2016 | Steele et al. | |
| 2002/0007561 A1 | * | 1/2002 | Malizia | ................ G01B 3/1071 33/528 |
| 2006/0191150 A1 | * | 8/2006 | Sikora, Jr. | ................ B25H 7/00 33/566 |

(Continued)

*Primary Examiner* — Christopher W Fulton
(74) *Attorney, Agent, or Firm* — Maier & Maier, PLLC

(57) ABSTRACT

An old work box device may be provided. The old work box device may include an adjustable device ring. Furthermore, the old work box device may have a measuring device affixed to the device ring, which may be capable of measuring a horizontal or vertical distance in relation to the device ring. A level may be provided on the device ring, which may be capable of leveling the device ring vertically or horizontally. A magnet or stud finder may be provided on the device ring, which may be capable of locating a stud for the installation of an old work box. The old work box may include a measurement scale along its perimeter and a marking device capable of marking desired locations a mounting surface.

8 Claims, 6 Drawing Sheets

(56) References Cited

U.S. PATENT DOCUMENTS

2008/0022543 A1\* 1/2008 Kesler .................... H02G 3/12
                                                    33/645
2009/0277029 A1  11/2009 Guzallis
2010/0095543 A1   4/2010 Inthavong
2012/0096724 A1\* 4/2012 Eyermann ................ G01B 3/00
                                                    33/354

\* cited by examiner

OLD WORK BOX DEVICE

BACKGROUND

Electrical boxes, or junction boxes, are used to enclose wire connections. These boxes protect wire connections and can prevent short circuits. Electrical boxes can be installed as part of new installation or in existing structures. Whether mounting in new or existing structures, proper measurements must be taken to ensure correct mounting. This is particularly difficult in existing structures, where new holes often must be cut in an existing surface in order to install the electrical box. Old work boxes, or remodeling boxes, are electrical boxes that are designed for installation in existing walls or surfaces, such as hung dry-wall. It may be desirable to hang an old work box in a location where pre-existing wires have been fed, at a desired location in the wall, and/or adjacent to a stud. It therefore may be desirable to have a combination tool, which may facilitate the measuring, placement, and installation of an electrical box.

SUMMARY

An old work box device may be provided. The old work box device may have a device ring. At least one measurement marking may be disposed on a perimeter of the device ring. At least one level may be mounted on the device ring and at least one stud-finder may be mounted on the device ring. Lastly, at least one measuring tape or measuring laser may be provided on the old work box device.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, an old work box device 100 may be provided. Old work box device 100 may facilitate the placement, installation and mounting of electrical boxes, including but not limited to old work boxes.

Figure 1:
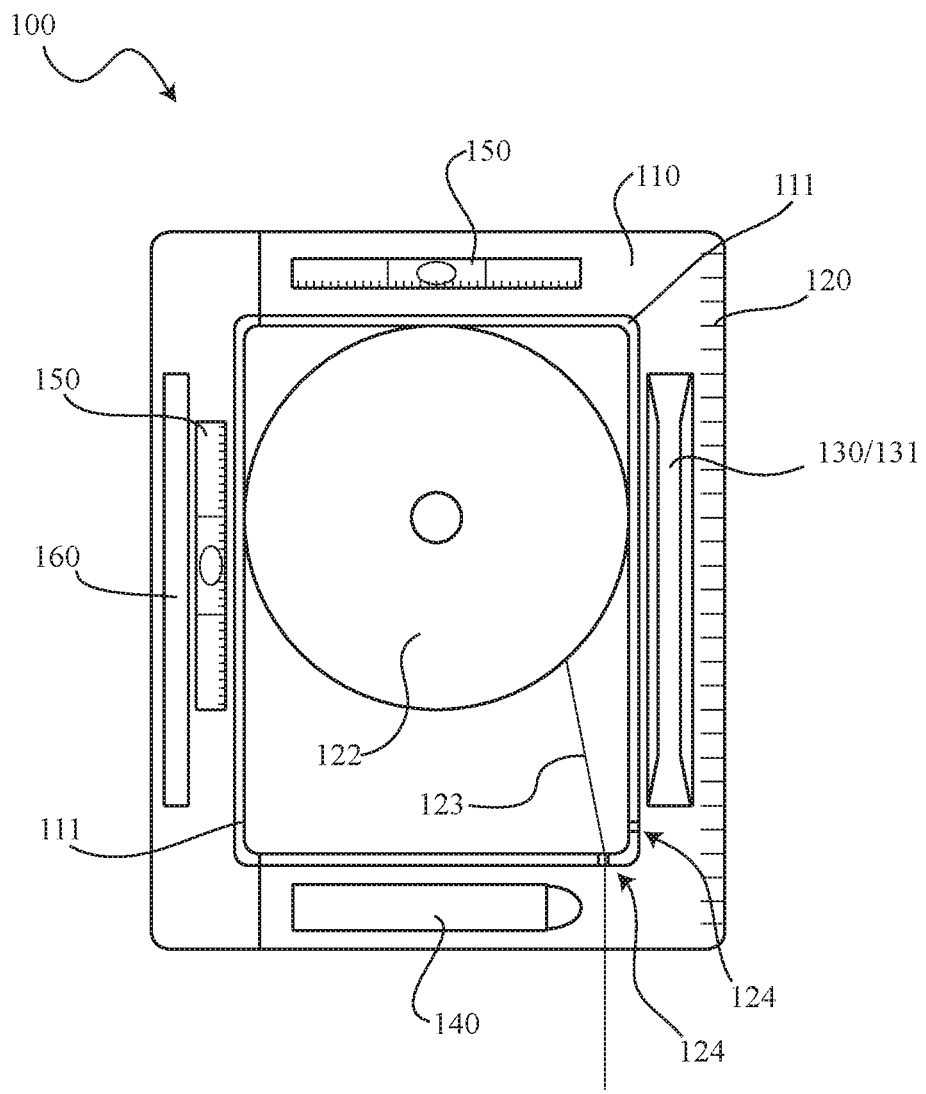
FIG. 1 shows an embodiment of an old work box device.
Figure 2:
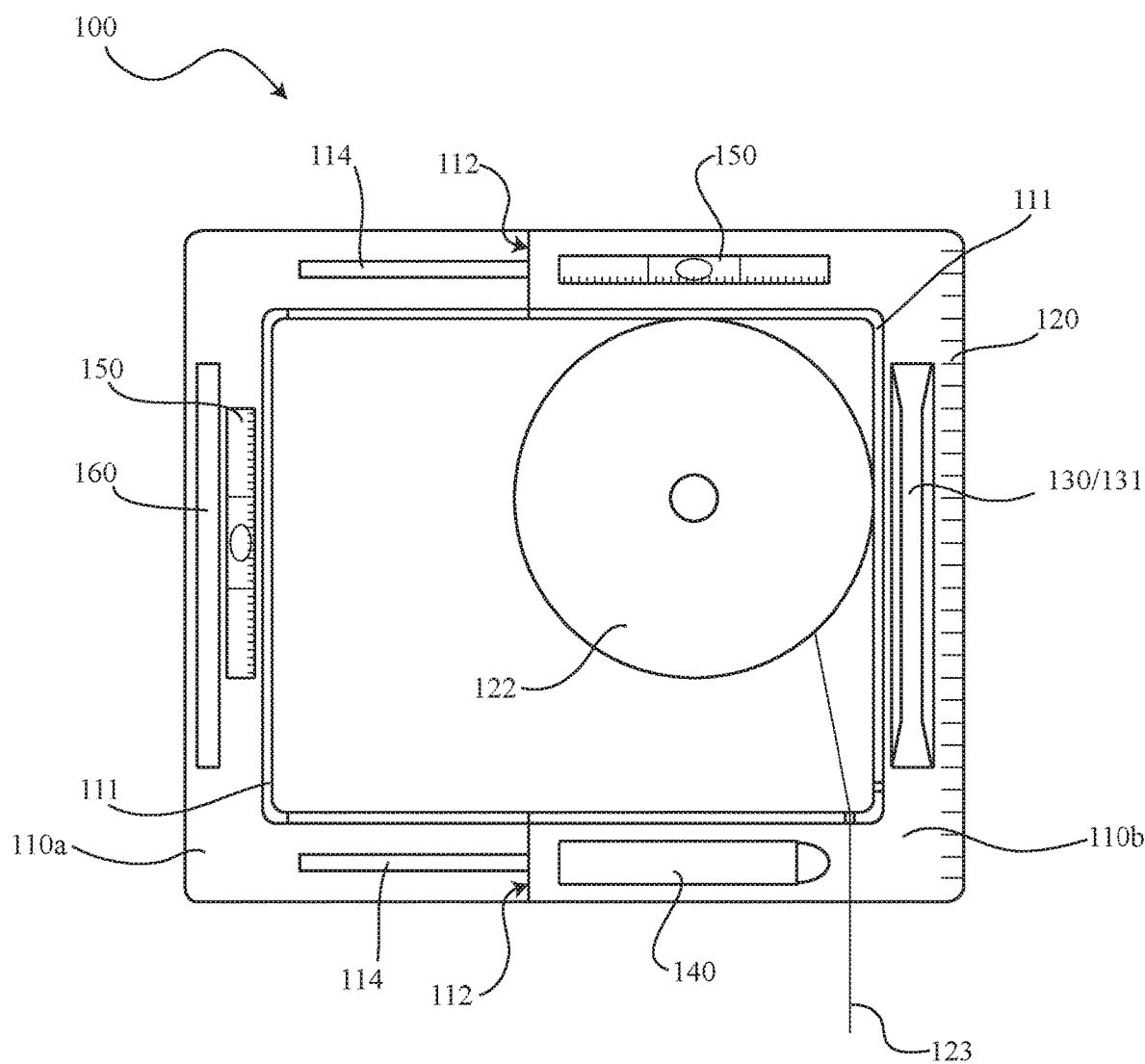
FIG. 2 shows an adjustable old work box device.

Referring to exemplary FIGS. 1-2, an old work box device may include a device ring 110, which may be a substantially rectangular frame having a hollow center. Traditionally, as would be understood by a person having ordinary skill in the art, device rings may affix to an open face of an electrical box and may facilitate the attachment of an electrical feature, such as a switch, for which the electrical box is placed. Device rings are often offset or raised in order to account for the thickness of drywall or other surfaces behind which an electrical box may be installed. Device ring 110 may be used as a base structure for an old work box device 100 and may optionally be offset or raised, as would be understood by a person having ordinary skill in the art. The raised wall 111 may assist with securing of accessory devices. Device ring 110 may be sized to match a desired electrical box, such as one gang, two gang, or adjustable between one or two gang. In some further exemplary embodiments, device ring 110 may be any desired size, such as, 3 gang, 4 gang, 5, gang, 6 gang, or adjustable among various sizes.

In adjustable embodiments, device ring 110 may have at least two pieces 110a and 110b (as shown in FIG. 2) affixed in a sliding manner. Pieces 110a and 110b may be slidably connected along extension axis 112, which may coincide with a front face of piece 110b, such that device ring 110 may expand in a direction transverse to axis 112. As shown in the Figures, at least one track for slidably securing pieces 110a and 110b may be disposed in piece 110a. A securing piece 113 protruding from the back side of 110b may be disposed through track 114 and may be capable of sliding along track 114, as would be understood by a person having ordinary skill in the art. When extended, raised wall 111 may have a break where extended. Alternatively, raised wall 111 of pieces 110a and 110b may be offset, such that they may slide in parallel, maintaining a raised wall around the perimeter.

Figure 3A:
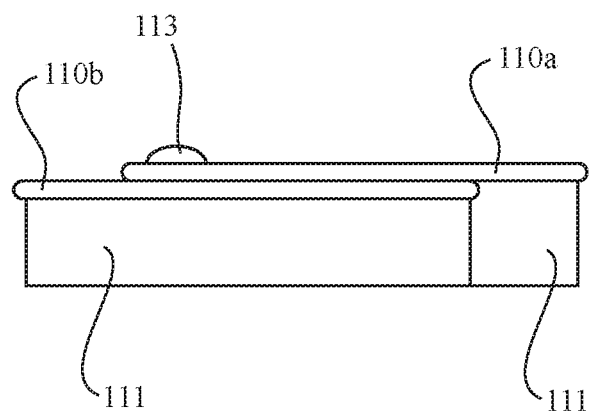
FIG. 3A shows a slidable connection for an expanding embodiment of an old work box device in a retracted position.
Figure 3B:
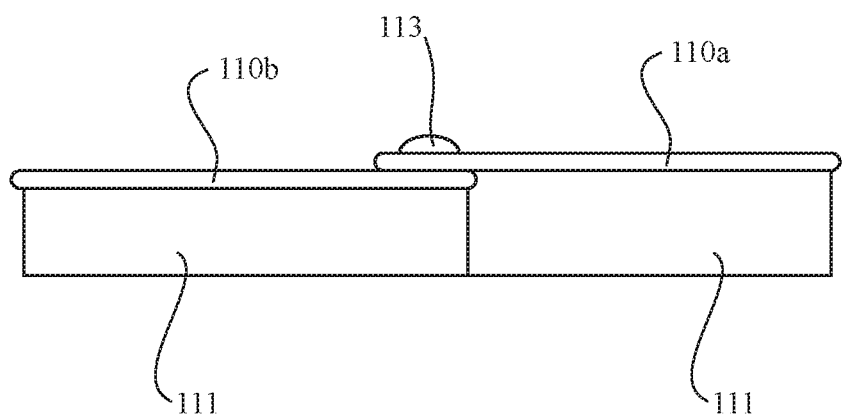
FIG. 3B shows a slidable connection for an expanding embodiment of an old work box device in an expanded position.

In some alternative exemplary embodiments, one side, 110a or 110b, or a portion thereof may be secured in a track protruding from the other side, 110a or 110b, which may allow the sides to slide in relation to each other. In some further embodiments, device ring 110 may include at least one telescoping member for adjusting among sizes. In embodiments where device ring 110 is adjustable, device ring 110 may include at least one locking member for securing device ring 110 at a desired size. Device ring 110 may include a tensioning element, such that the sliding relationship of 110a and 110b is restricted or affected at predetermined points matching standard sizing for work boxes. It is noted that the dimensions of pieces 110a and 110b may not reflect actual dimensions or scale in exemplary FIGS. 2-3 for functionality as described herein, but may be understood by a person having ordinary skill in the art.

The adjustable pieces of device ring 110 may be capable of adjusting the width and/or height of the device ring. In some embodiments, a device ring 110 may have more than two adjustably connected pieces, which may allow for adjustment of the height and width of the device ring.

Device ring 110 may have at least one measurement scale or marking 120 disposed on its perimeter. Measurement marking 120 may facilitate marking, aligning, and measuring mounting locations and/or cuts in a mounting surface. Measurement marking 120 may be disposed on at least one of a vertical and horizontal perimeter. Furthermore, device 100 may include at least one marking hole or notch disposed in device ring 110, which may provide for easy marking of standard reference points for mounting an old work box in a desired surface. Device 100 may have at least one measuring tool, which may include a measuring tape 122, for facilitating the measuring of a mounting location on a mounting surface, including a mounting height or horizontal spacing. Measuring tape 122 may be secured to a face of device ring 110 and/or at least one face of raised wall 111. In embodiments where device ring 110 is offset, tape 123 of measuring tape 122 may pass through a slit 124 disposed in device ring 110. Device ring 110 may have multiple slits 124 for facilitating vertical and horizontal measurement. In some exemplary embodiments, other measurement devices may be utilized to supplement or replace the abovementioned, such as a laser measurement device 140, which may be mounted on device 100.

Device 100 may further include a mount 130 for mounting at least one marking utensil 131. Marking utensil may include a pen, pencil, marker, or other marking utensil as would be understood by a person having ordinary skill in the art. Mount 130 may include a hook and loop type fastener, adhesive, a sleeve, snap fit, or other form of mount as would be understood by a person having ordinary skill in the art. Mount 130 may optionally be disposed on a surface of device ring 110, such as a top surface, or a surface of raised wall 111.

According to some exemplary embodiments, device 100 may have at least one level 150 mounted thereto or integrally formed therein, which may facilitate proper alignment when installing an old work box. In embodiments having multiple levels 150, there may be at least one level 150 in a vertical orientation and at least one level 150 in a horizontal orientation. Levels 150 may optionally be disposed on a surface of device ring 110, such as a top surface, or a surface of raised wall 111.

Device 100 may further have a stud finder and/or a magnet 160 disposed thereon to assist with the location of studs or other desired materials, including wires, pipes or metal structures behind a mounting surface, in order to facilitate selecting a proper mounting location. In some embodiments, stud finder 160 may be mounted on device ring 110 or formed integrally therewith. Stud finder/magnet 160 may optionally be disposed on a surface of device ring 110, such as a top surface, or a surface of raised wall 111.

In some exemplary embodiments, device ring 110 may optionally be transparent, which may assist with aligning and measuring. As would be understood by a person having ordinary skill in the art, device 100 may similarly be used to facilitate placement and installation of a variety of electrical boxes, including handy boxes, junction boxes, new work boxes, old work boxes, outdoor boxes, junction boxes, standard rectangular boxes, square boxes, round or octagonal boxes, ceiling boxes, or other boxes as desired. In certain embodiments, device 100 may have a varied cross-sectional shape to match that of a desired box, including a round or octagonal box.

In operation, a user may select an appropriately sized device 100 or adjust the size of device 100 to match an electrical box to be installed. Next, the user may align device 100 on a mounting surface, such as drywall, at an approximate desired location. The user may then use the stud finder 160 to ensure a desired location in relation to a stud. The user may then use at least one of the measuring tape 122 or laser measurement device 140 to align the device at a more precise desired location. The user may further use the at least one level 150 to adjust the alignment. Throughout alignment and positioning of the device 100, a user may utilize a marking utensil 131 and/or measurement markings 120 to mark desired installation points in relation to device ring 110. Once the device ring 110 is positioned in a desired manner, the user may mark mounting reference points. Finally, the user may cut the mounting surface and install the desired electrical box at the desired location.

Figure 4:
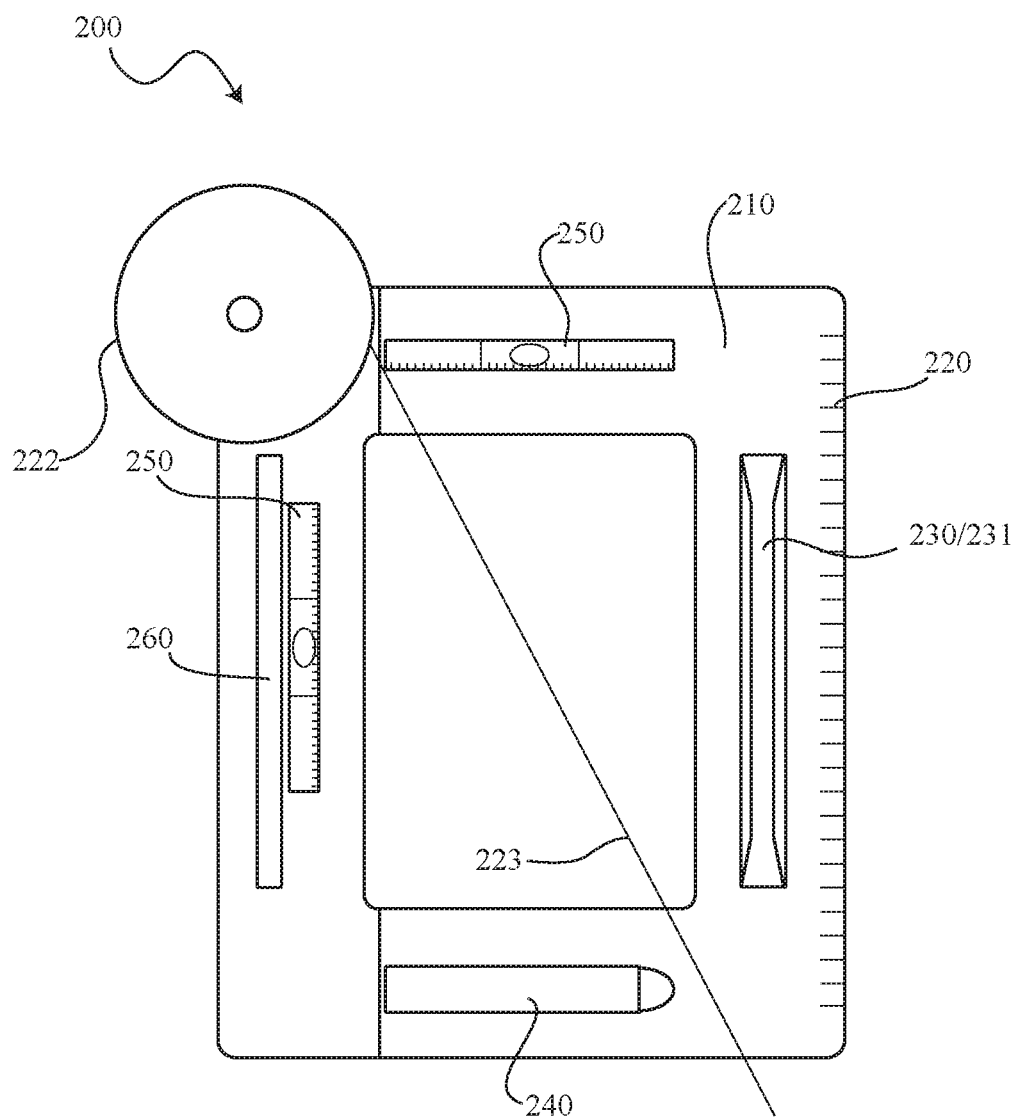
FIG. 4 shows an embodiment of an old work box device.
Figure 5:
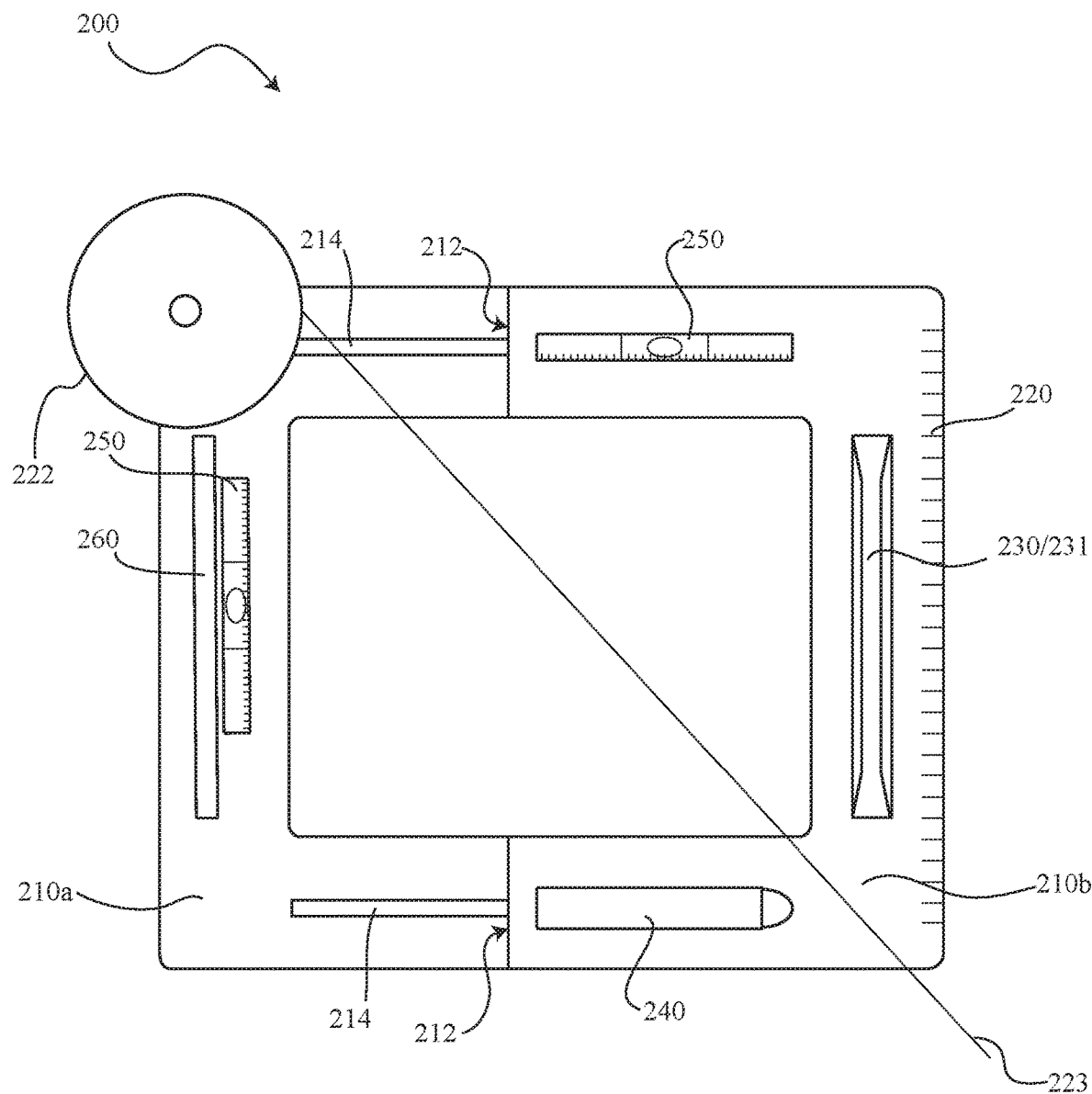
FIG. 5 shows an embodiment of an old work box device.

Now referring to exemplary FIGS. 4-5, device 200 may be provided. Device 200 may have a substantially flat device ring 210. The arrangement of measurement markings 220, measuring tape 222/223, stud finder 260, the at least one level 250, marking utensil 231 and utensil mount 230, alternative measurement laser 240, and/or any additional accessories as would be understood by a person having ordinary skill in the art may be situated on a front face of the substantially flat device ring 210. In an exemplary embodiment, as shown in FIG. 4, measuring tape 222 may be mounted on a surface of device ring 210 rather than within an interior void of device ring 210. The flat device ring 210 shown in FIGS. 4-5 may be adjustable in size in perpendicular relation to an extension axis 212. For example, sides 210a and 210b may be adjoined in a sliding manner using tracks 214.

Figure 6:
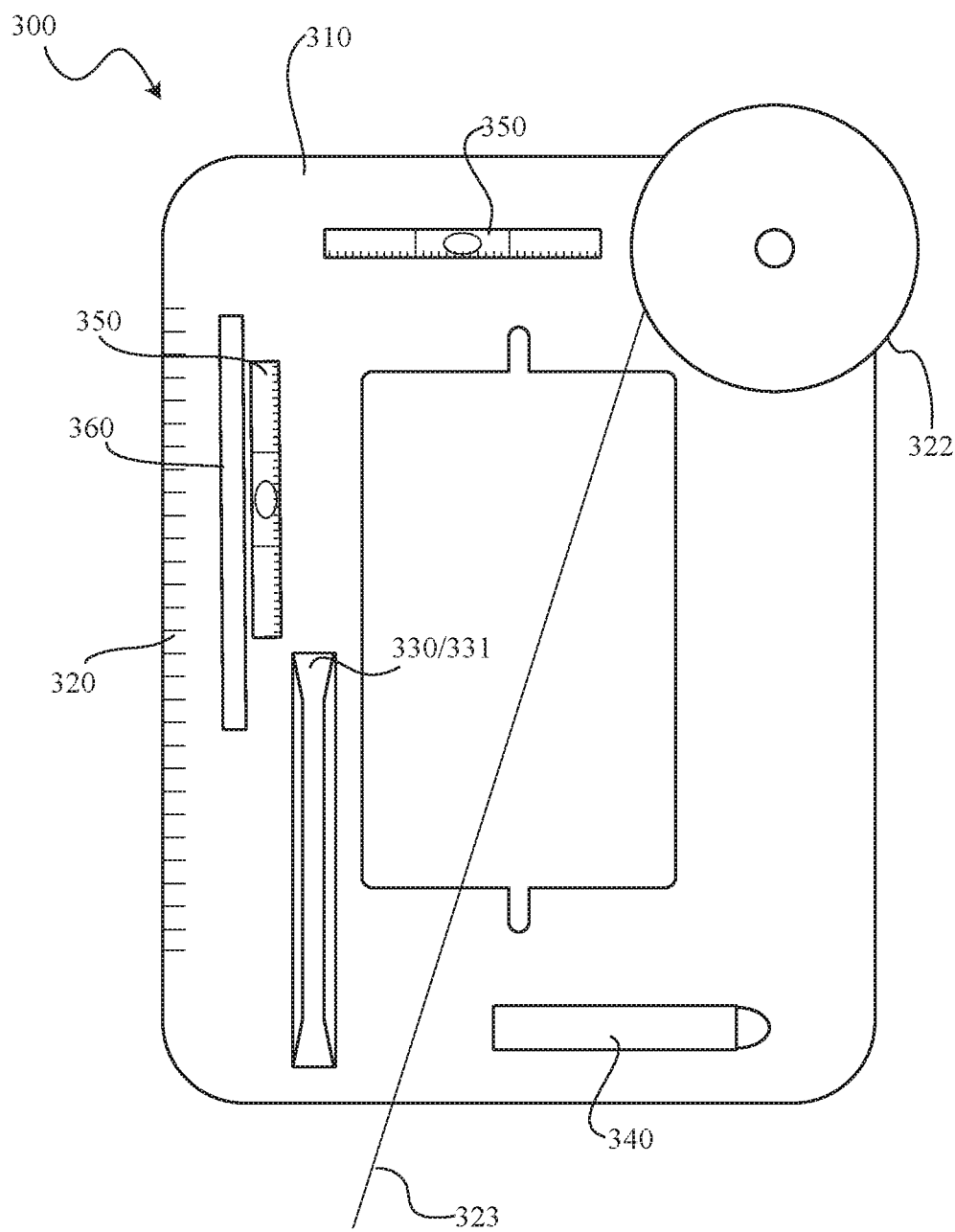
FIG. 6 shows another embodiment of an old work box device.
Figure 7:
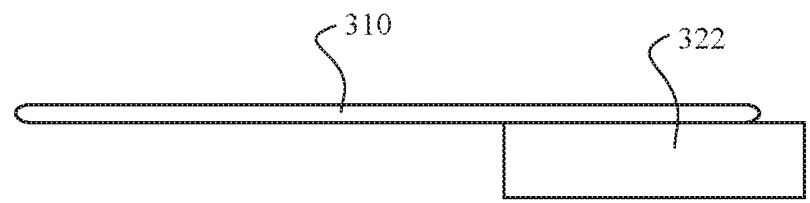
FIG. 7 shows a side view of an old work box device.

Now referring to exemplary FIGS. 6-7, yet another old work box device 300 may be provided. Device 300 may have a device ring 310 that is substantially flat and fixed in size. Device 300 may similarly have measurement markings 320 on at least one edge, measuring tape 322/323 mounted on a surface of device ring 310, at least one level 350, a stud finder 360, marking utensil 331 and utensil mount 330, alternative measurement laser 340, and/or any additional accessories as would be understood by a person having ordinary skill in the art.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An old work box device comprising:
   a device ring;
   at least one measurement marking disposed on a perimeter of the device ring;
   at least one level mounted on the device ring;

at least one stud-finder mounted on the device ring; and
at least one of a measuring tape or measuring laser,
wherein the device ring is an offset device ring having a raised wall, and
wherein the measuring tape is secured to an interior surface of the raised wall of the offset device ring and a tape of the measuring tape is configured to pass through a slit in the raised wall of the device ring.

2. The old work box device of claim 1, further comprising at least one mount for a marking utensil.

3. The old work box device of claim 1, further comprising a vertical level and a horizontal level mounted on the device ring.

4. The old work box device of claim 1, further comprising a measuring laser disposed in a vertical orientation and a measuring laser disposed in a horizontal orientation.

5. The old work box device of claim 1, further comprising two slits in the raised wall of the device ring, wherein a first slit is configured to allow the measuring tape to extend in a vertical direction and a second slit is configured to allow the measuring tape to extend in a horizontal direction.

6. The old work box device of claim 1, wherein the device ring is expandable.

7. The old work box device of claim 6, wherein the device ring comprises at least two pieces slidably connected.

8. The old work box device of claim 7, wherein the device ring comprises a first piece and a second piece and the first piece is configured to slide along a track disposed on the second piece.

* * * * *